(12) United States Patent
Zhang et al.

(10) Patent No.: US 10,595,165 B2
(45) Date of Patent: Mar. 17, 2020

(54) DEVICE LOCATION TRACKING WITH TAG ANTENNA SWITCHING

(71) Applicant: Cisco Technology, Inc., San Jose, CA (US)

(72) Inventors: Xu Zhang, Santa Clara, CA (US); John Martin Blosco, Norton, OH (US); Xiangxiang Fang, Campbell, CA (US); Danielle Bane, Cleveland, OH (US); Matthew Aaron Silverman, Shaker Heights, OH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/045,425

(22) Filed: Jul. 25, 2018

(65) Prior Publication Data

US 2020/0037109 A1    Jan. 30, 2020

(51) Int. Cl.
*H04W 24/00* (2009.01)
*H04W 4/029* (2018.01)
*H04W 4/80* (2018.01)
*H04W 88/08* (2009.01)
*H04M 1/725* (2006.01)
*H04W 88/02* (2009.01)

(52) U.S. Cl.
CPC ........ *H04W 4/029* (2018.02); *H04M 1/72519* (2013.01); *H04M 1/72522* (2013.01); *H04W 4/80* (2018.02); *H04W 88/02* (2013.01); *H04W 88/08* (2013.01)

(58) Field of Classification Search
CPC ....... H04W 4/029; H04W 4/80; H04W 88/08; H04W 88/02; H04W 8/245; H04M 1/72519; H04M 1/72522

USPC .................................. 455/456.1, 550.1, 418
See application file for complete search history.

(56) References Cited

U.S. PATENT DOCUMENTS

| 8,630,588 B2 * | 1/2014 | Liu ..................... H04B 7/0617 370/338 |
| 10,211,904 B2 * | 2/2019 | Hessler ................ H04B 7/0689 |
| 2010/0304680 A1 * | 12/2010 | Kuffner ................... H04B 7/10 455/63.1 |
| 2012/0134279 A1 * | 5/2012 | Tamaki .................. H04B 7/024 370/248 |
| 2012/0281783 A1 * | 11/2012 | Cheng .................. H04B 7/0456 375/295 |
| 2014/0024323 A1 * | 1/2014 | Clevorn ............ H04W 52/0229 455/83 |
| 2014/0308976 A1 * | 10/2014 | Garin .................... H04W 4/023 455/456.2 |
| 2015/0003338 A1 * | 1/2015 | Xue ....................... H04W 76/10 370/329 |
| 2015/0201380 A1 * | 7/2015 | Jakab .................... H04W 52/04 455/522 |

(Continued)

*Primary Examiner* — Danh C Le
(74) *Attorney, Agent, or Firm* — Patterson + Sheridan, LLP

(57) ABSTRACT

In one embodiment, a method is performed. A device may receive an antenna state configuration and a sequence from a wireless access point (AP) device. A plurality of antenna states configured on the device may be selected based on the antenna state configuration and the sequence. An inertial measurement unit (IMU) measurement may be determined. A beacon signal may be transmitted for each selected antenna state. Each transmitted beacon signal may indicate a corresponding selected antenna state.

18 Claims, 6 Drawing Sheets

(56) References Cited

U.S. PATENT DOCUMENTS

| | | | |
|---|---|---|---|
| 2015/0215019 A1* | 7/2015 | Bengtsson | H04B 7/0404 |
| | | | 455/69 |
| 2015/0358104 A1* | 12/2015 | Ohwatari | H04B 7/0456 |
| | | | 370/252 |
| 2016/0255604 A1* | 9/2016 | Venkatraman | H04W 24/08 |
| | | | 455/456.1 |
| 2017/0078008 A1* | 3/2017 | Kasher | H04B 7/0617 |
| 2017/0346517 A1* | 11/2017 | Ying | H04B 17/336 |
| 2018/0026700 A1* | 1/2018 | Andonieh | H04B 7/0665 |
| | | | 375/267 |
| 2018/0038937 A1* | 2/2018 | Afzal | G01S 5/12 |
| 2018/0159608 A1* | 6/2018 | Zeng | H04B 7/0408 |
| 2018/0294871 A1* | 10/2018 | Kosseifi | H04B 7/18506 |
| 2018/0302137 A1* | 10/2018 | Maltsev | H04B 7/0695 |
| 2019/0053071 A1* | 2/2019 | Ly | H04W 16/28 |

* cited by examiner

DEVICE LOCATION TRACKING WITH TAG ANTENNA SWITCHING

TECHNICAL FIELD

The present disclosure generally relates to location tracking using tags.

BACKGROUND

Devices, such as tags, may be used to provide location tracking services, for example, in indoor environments. Use cases for such devices may include floor beacons and asset tracking. Location tracking accuracy may be suboptimal in some environments due to multipath issues that may be attributable to features of the environment. Unpredictable client antenna patterns may also adversely affect location tracking accuracy.

BRIEF DESCRIPTION OF THE DRAWINGS

For an understanding of aspects of various embodiments described herein and to show how they may be carried into effect, reference is made, by way of example only, to the accompanying drawings.

DESCRIPTION OF EXAMPLE EMBODIMENTS

Overview

Figure 1:
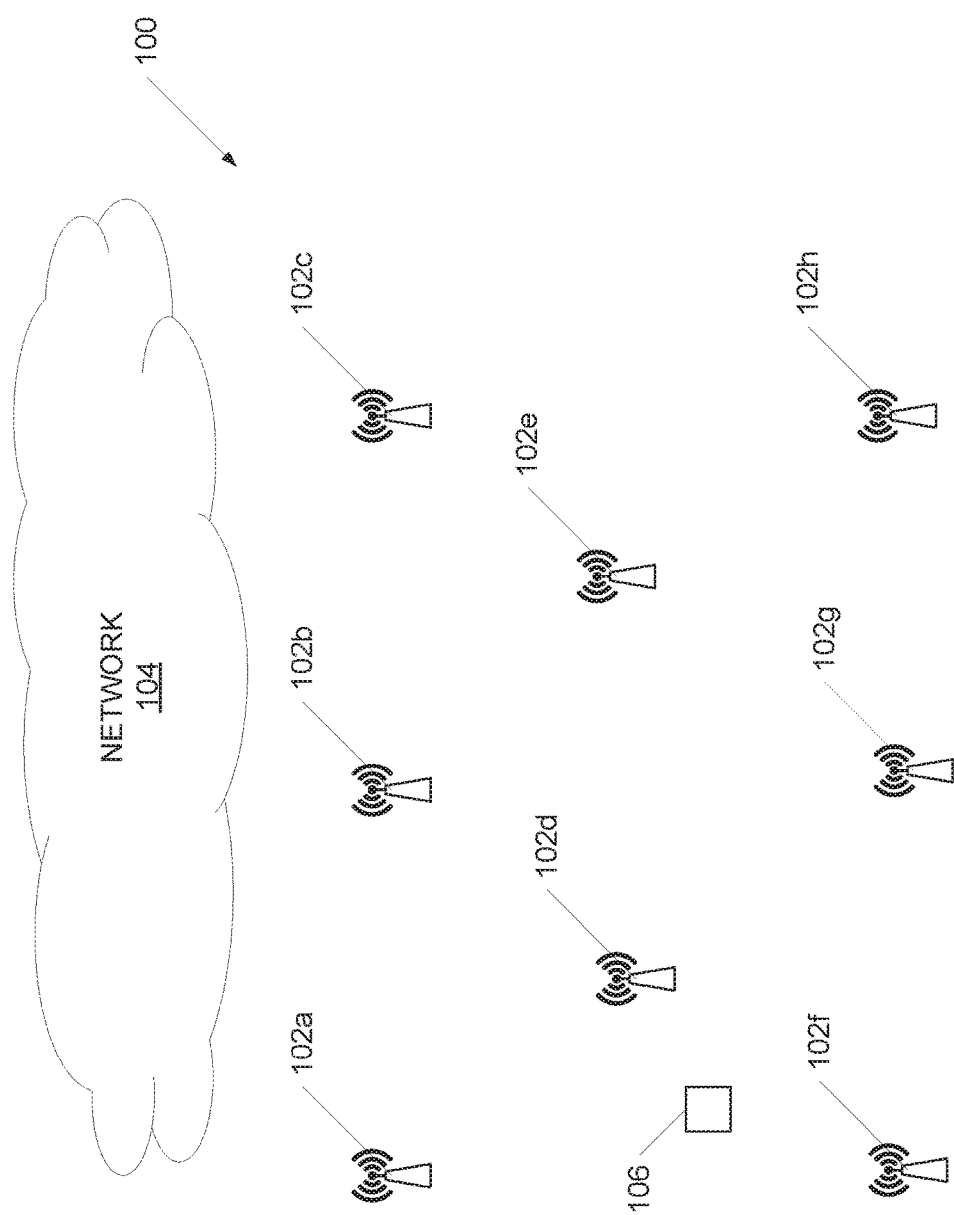
FIG. 1 is a diagram that illustrates an example system in which location aware wireless access points (APs) may be deployed.

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example embodiments described herein.

Various embodiments disclosed herein may include devices, systems, and methods for device location tracking with antenna switching. In one embodiment, a method is performed. A device may receive an antenna state configuration and a sequence from a wireless access point (AP) device. A plurality of antenna states configured on the device may be selected based on the antenna state configuration and the sequence. An inertial measurement unit (IMU) measurement may be determined. A beacon signal may be transmitted for each selected antenna state. Each transmitted beacon signal may indicate a corresponding selected antenna state.

In an embodiment, a wireless AP device may comprise a network interface in communication with a network. A processor may be configured to execute computer readable instructions included on a non-transitory memory. A non-transitory memory may include processor-readable instructions, that when executed by the processor, cause the wireless AP device to receive a beacon signal from a location device. The wireless AP device may determine motion of the location device based on the beacon signal. The wireless AP device may select an antenna state configuration based at least in part on the determined motion of the location device. The antenna state configuration may comprise at least one of an antenna selection or an antenna phase. The wireless AP device may send the location device the selected antenna state configuration.

Example Embodiments

In some implementations, a location device, such as a Bluetooth low energy (BLE) or WiFi tag, and a wireless access point (AP) device may coordinate antenna switching or beam steering. For example, a location device may incorporate multiple directional antennas and/or antenna paths. The antennas may have individual antennas with different antenna patterns or may use phase shifters to produce different beam patterns with different combinations of phase delays.

In some implementations, a location device may notify a wireless AP device of which antenna or steering state it may transmit in. An antenna state may include a selection of an antenna, a phase, or a combination of an antenna and a phase. The location device may switch between or cycle through a number of antenna states in a sequence. The location device may notify the wireless AP device of the number of antenna states that make up the sequence. The wireless AP device may coordinate, determine, and/or control the number of antenna states the location device may use based on one or more criteria. These criteria may include, for example, environmental factors and detected motion of the location device.

In some implementations, the location device may determine an inertial measurement unit (IMU) measurement. The number of antenna states in the sequence used by the location device may be based on the IMU measurement. The location device may communicate the IMU measurement to the wireless AP device, for example, using a beacon signal.

FIG. 1 illustrates an example system 100 in which location aware wireless access points (APs) may be deployed. The system 100 may be located, for example, in a store, warehouse, or other indoor environment in which it may be beneficial to precisely locate customers, employees, equipment, or other assets.

The system 100 may include a number of wireless APs 102a, 102b, 102c, 102d, 102e, 102f, 102g, 102h (collectively referred to as wireless APs 102) in communication with a network 104. Those skilled in the art will understand that the system 100 may include more or fewer wireless APs than are depicted in FIG. 1. The wireless APs 102 may be implemented, for example, as beacon devices.

The wireless APs 102 may be in communication with the network 104. The network 104 may determine the locations of location devices present in the system and deliver location-relevant content to users. For example, the network 104 may deliver map information or advertisements to users based on their detected locations.

One or more location devices may be present in the system 100. For purposes of illustration, FIG. 1 illustrates one location device 106. The location device 106 may be implemented using any of a variety of technologies. For example, the location device 106 may be implemented as a Bluetooth low energy (BLE) tag. The location device 106 may be implemented as a WiFi location device. The location device 106 may be implemented as a wireless device that is Bluetooth or WiFi capable, such as many mobile telephones.

The location device 106 may transmit a signal, e.g., a beacon signal, that may be received by the wireless AP device 102. The wireless AP device 102 may determine a received signal strength indicator (RSSI) and/or an angle of arrival (AoA) associated with the signal. The wireless AP device 102 may determine a location of the location device, for example, based on the RSSI and/or AoA and may use information from other wireless AP devices 102 in the system 100.

The accuracy of the system 100 in locating the location device 106 may be affected by bias. For example, a transmitting antenna in the location device 106 may not have a uniform radiation pattern. Even if the antenna is omnidirectional, RSSI measurements may be taken at an instant in time and may not be representative of signal strength over time. Changing the orientation of the location device 106 may change the detected RSSI at the wireless AP device 102, which may cause the wireless AP device 102 to miscalculate the distance between itself and the location device 106. Further, environmental features, such as walls, trees, and other obstacles, reflect radio waves and introduce multipath interference that can adversely affect measurements. Removing bias due to these factors may be difficult or impossible, particularly in the case of narrowband signals, such as Bluetooth signals.

In some implementations, the location device 106 may use different antenna states, such as different transmit antennas and/or antenna phases, to transmit signals, e.g., beacon signals, to the wireless AP device 102. Certain selections of antenna states may produce non-line-of-sight (NLOS) or multipath measurement components that are highly decorrelated with each other. Line-of-sight (LOS) measurement components, on the other hand, may be highly correlated between different antenna states.

In some implementations, the wireless AP device 102 may combine measurements obtained from the location device 106 in different antenna states. When the measurements are combined, the NLOS or multipath measurement components may be attenuated. The LOS measurement components may be enhanced.

In some implementations, the wireless AP device 102 and the location device 106 may coordinate selection of antenna states to produce measurements with decorrelated NLOS components and correlated LOS components. The wireless AP device 102 may send an antenna state configuration or profile to the location device 106 that may specify a sequence of antenna states through which the location device 106 should cycle. The location device 106 may cycle through the sequence of antenna states and transmit beacon signals to the wireless AP device 102. As the location device 106 switches between antenna states, the transmission beam pattern properties may be changed. Multipath interference may be changed. When the wireless AP device 102 combines measurements obtained using different antenna states, NLOS or multipath measurement components may be substantially reduced. The location of the location device 106 may be determined more accurately.

Figure 2:
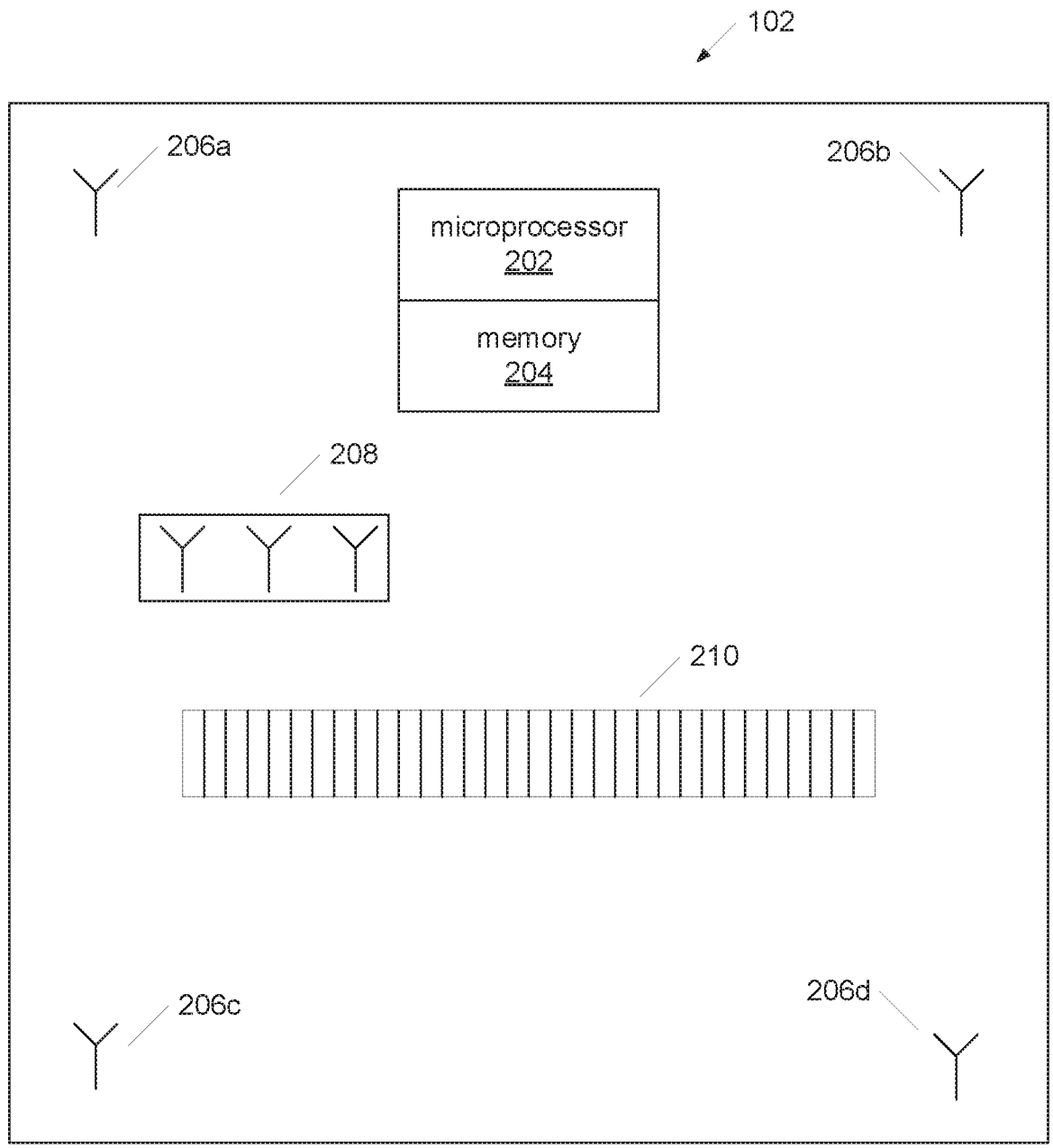
FIG. 2 is a diagram that illustrates an example wireless AP device that may form part of the system of FIG. 1.

FIG. 2 illustrates an example wireless AP device 102. The wireless AP device 102 may include a microprocessor 202 and a memory 204 in communication with the microprocessor 202. The wireless AP device 102 may include a number of antennas that may be controlled by the microprocessor 202. For example, antennas 206*a*, 206*b*, 206*c*, 206*d* (collectively referred to as antennas 206) may be implemented as dual-band (e.g., 2.4 GHz/5 GHz) antennas that may be used for sending and receiving signals to and from client devices, such as the location device 106. These signals may be used for configuring client devices or for receiving measurements or other data from client devices, for example. An antenna module 208 may include additional (e.g., dual-band) antennas that may also be used for sending and receiving signals to and from client devices. The antennas in the antenna module 208 may be implemented as, for example, Bluetooth low energy (BLE) antennas. An antenna array 210 may incorporate additional antennas that may be used for precise location of client devices. The wireless AP device 102 may incorporate more or fewer antennas and/or antenna types than are depicted in FIG. 2.

The antennas may be controlled by the microprocessor 202 in accordance with processor-executable instructions that may be stored in the memory 204. The microprocessor 202 may process signals received by one or more of the antennas 206, 208, 210 from the location device 106 to determine the angle of arrival of the signals and the location of the location device 106.

Figure 3:
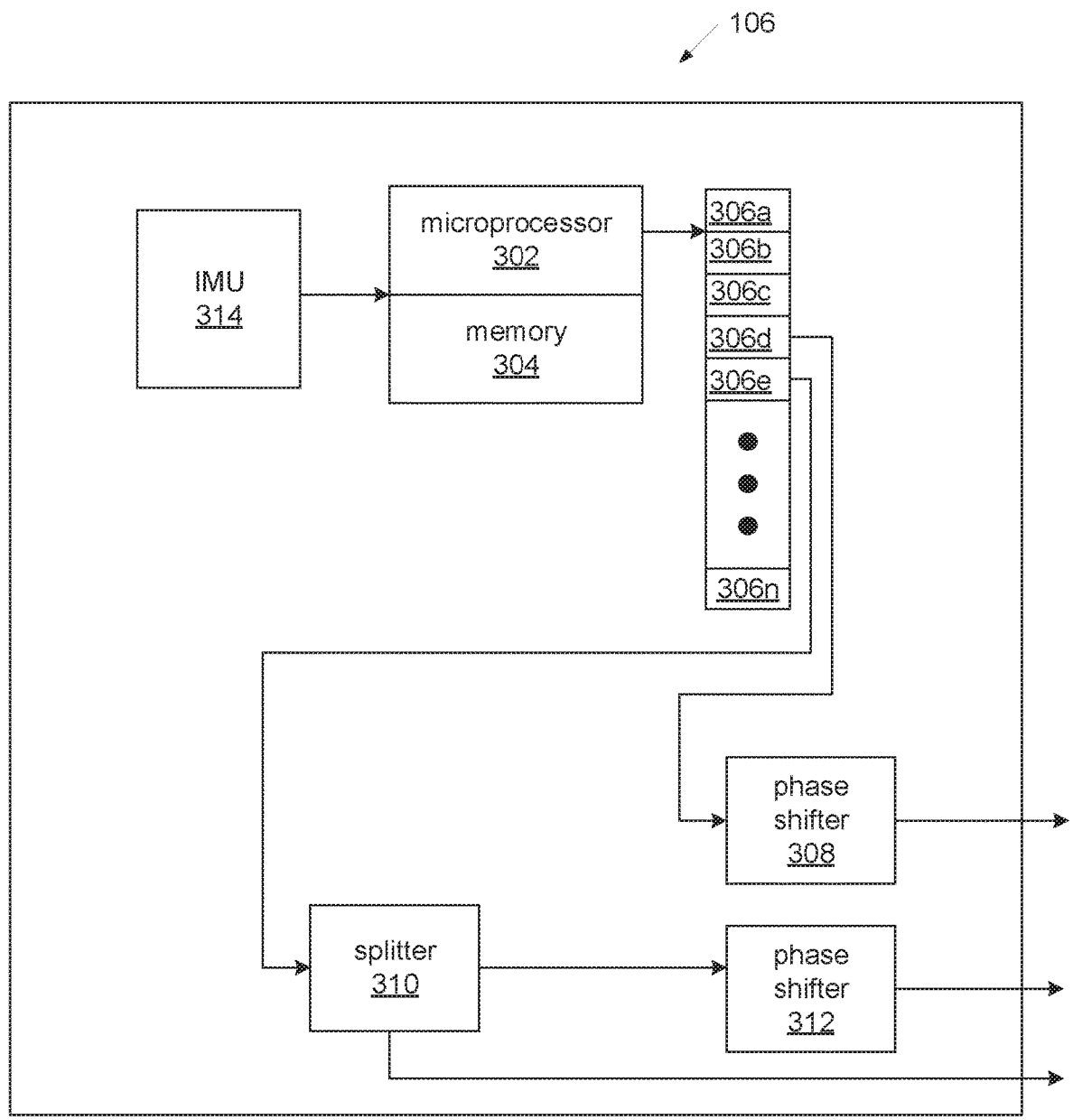
FIG. 3 is a diagram that illustrates an example location device that may form part of the system of FIG. 1.

FIG. 3 illustrates an example location device 106. The location device 106 may be implemented, for example, as a mobile phone or as a Bluetooth low energy (BLE) tag. The location device 106 may include a microprocessor 302 and a memory 304 in communication with the microprocessor 302. The location device 106 may include a number of antennas 306*a*, 306*b*, 306*c*, 306*d*, 306*e*, . . . , 306*n* (collectively referred to as antennas 306) that may be controlled by the microprocessor 302. The antennas 306 may be directional. The antennas 306 may transmit signals, e.g., beacon signals, and may produce different transmission patterns or radiation patterns. For example, a given antenna may have certain directions in which more or less signal power is radiated. Accordingly, the use of different antennas 306 to transmit a signal may result in different signal characteristics. Signals transmitted by different antennas 306 may exhibit different multipath characteristics as they travel to the wireless AP device 102.

The use of different antennas 306 individually or in combination with one another may result in different antenna states. For example, if the location device 106 has two antennas 306*a*, 306*b*, a first antenna state may involve transmitting from antenna 306*a*. A second antenna state may involve transmitting from antenna 306*b*. A third antenna state may involve transmitting from both antennas 306*a*, 306*b*. As another example, if the location device has three antennas 306*a*, 306*b*, 306*c*, potential antenna states may involve transmitting from individual antennas, combinations of two antennas, or all three antennas.

The number of antenna states that may be used by the location device 106 may be increased by the use of phase shifters. For example, one of the antennas 306 may have its output processed by a phase shifter 308 before it is transmitted. A splitter 310 may receive the output of another antenna 306 and may provide two or more outputs, one of which may be processed through a phase shifter 312 before transmission. Shifting the phase of a signal may facilitate the realization of more antenna states.

An inertial measurement unit (IMU) module 314 may provide information to the microprocessor 302. This information may include measurements from an accelerometer or a gyroscope, for example. The microprocessor 302 may process the information to determine whether the location device 106 is in motion. The location device 106 may transmit IMU information to the wireless AP device 102, for example, as part of a frame or beacon.

The location device 106 may receive an antenna state configuration from the wireless access point (AP) device 102. The antenna state configuration may specify a number (e.g., quantity) of antenna states (e.g., antenna selections and/or antenna phase selections) for the location device 106 to use to transmit beacons. The antenna state configuration may specify particular antenna states, which may be preferred antenna states, that the location device 106 should use.

Antenna states may be preconfigured on the location device 106, for example, in the memory 304. The microprocessor 302 may select one or more of the antenna states to cycle through or switch between in a sequence of antenna states based on the antenna state configuration received from the wireless AP device 102. The microprocessor 302 may select one or more of the antenna states based in part on information received from the IMU module 314. The microprocessor 302 may select a sequence of antenna states based in part on information received from the IMU module 314. For example, antenna states and/or antenna state sequences may be selected based on IMU measurements and/or based on changes in IMU measurements over time, which may indicate motion and/or acceleration.

The microprocessor 302 may cause the location device 106 to transmit a signal, e.g., a beacon signal, for each selected antenna state. These transmitted signals may form a cycle or sequence of signals as the location device 106 cycles through or switches between selected antenna states. Each transmitted signal may indicate the antenna state that the location device 106 used to transmit the signal.

The microprocessor 302 may cause the location device 106 to enter a training mode. In the training mode, the location device 106 may cycle through several, e.g., all configured antenna states. The wireless AP device 102 may determine measurements from the signals transmitted in the antenna states used in the training mode and use the measurements to evaluate the effectiveness of the antenna states in producing decorrelated multipath components. The wireless AP device 102 may select antenna states that are effective, e.g., that produce highly decorrelated multipath components, and reprogram or reconfigure the location device 106 with an antenna state configuration or profile.

Figure 4:
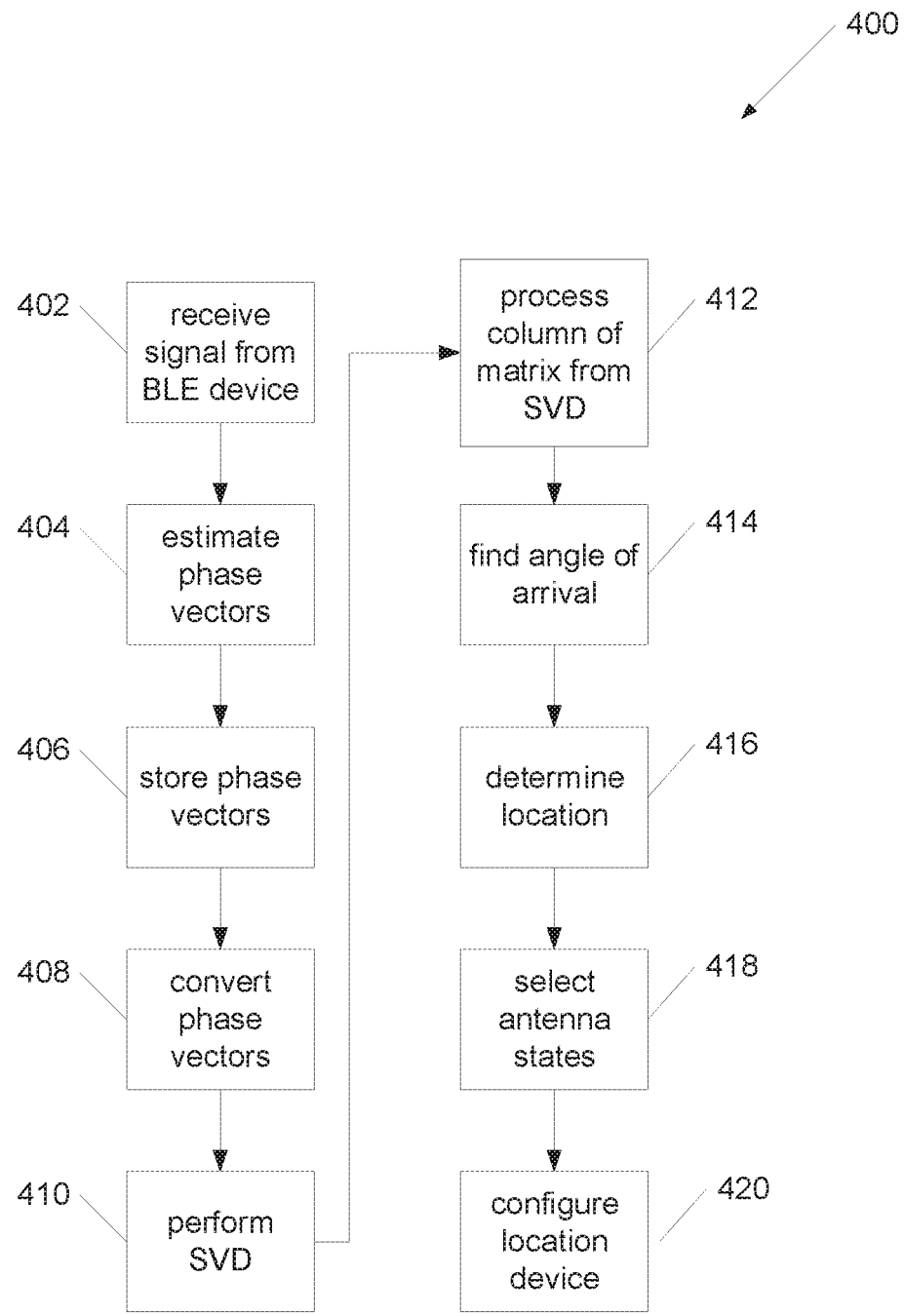
FIG. 4 is a flow diagram that illustrates an example process that may be performed by the system of FIG. 1.

FIG. 4 illustrates an example process 400 that may be performed by the system 100. At 402, a wireless AP device 102 may receive a signal from the location device 106. The signal may be or may include a BLE signal.

At 404, the wireless AP device 102 may process the received signal to estimate phase vectors as measured at the antennas.

At 406, the wireless AP device 102 may store a number of estimated phase vectors $\{A1, A2, \ldots, AN\}$ over time for a given location device 106. The wireless AP device 102 may also store a number of time tags $\{T1, T2, \ldots, TN\}$, IMU readings $\{R1, R2, \ldots, RN\}$, and/or transmit antenna states $\{S1, S2, \ldots, SN\}$ for the location device 106. This stored information may be used to detect changes in transmit antenna states, motion of the location device 106, and/or errors.

For example, for a duration i, such that $Ti-T1<\delta$, where i may be dynamically set and $\delta$ may be a threshold time interval, a difference $\{Si\}-\{S1, S2, \ldots, Si-1\}$ that is not the null set Ø may indicate that the transmit antenna state has changed. A difference $\{Ri\}-\{R1, R2, \ldots, Ri-1\}$ that is not the null set Ø may indicate that the location device 106 has moved. If both of these differences are non-null, an estimated phase vector Ai may be included if $|Ai-Aj|>\varepsilon$, $\forall j<i$, which may indicate that there is at least a certain amount of error from previous captures with the same transmit antenna state. If IMU measurements do not indicate significant movement, the wireless AP device 102 may use beacon signals received from a single transmit antenna state if the estimated phase vector Ai indicates error between measurements derived from the beacon signals, as these measurements may have decorrelated NLOS components despite being associated with the same antenna state and similar positions.

If two or more measurements are highly correlated with each other, the benefit of combining the measurements may not be significant, as NLOS components may not be attenuated. The computational burden on the wireless AP device 102 in combining measurements may be reduced. For example, one or more measurements may be eliminated from consideration. A limited subset of measurements (e.g., one measurement) may be considered. The measurements to be considered may be selected, e.g., randomly.

If two or more measurements are highly decorrelated with each other, their respective antenna states may be selected as preferred antenna states for the location device 106 to cycle through. This may increase decorrelation between measurements and facilitate extraction of the LOS components of the measurements, increasing the confidence in the location determination.

After the phase vectors have been estimated and/or stored, the wireless AP device 102 may process the phase vectors to extract the LOS components and attenuate or suppress the NLOS components. At 408, the wireless AP device 102 may convert the estimated phase vectors $\{A1, A2, \ldots, AN\}$ to phasors $\{X1, X2, \ldots, XN\}$. The phasors may be stored as a phasor matrix X. This conversion may be performed, for example, using the equation $$X_i = \exp(\sqrt{-1} * A_i)$$

At 410, for the matrix $\mathbb{X} = \{X1, X2, \ldots, XN\}$, the wireless AP device 102 may perform a singular value decomposition (SVD) $UDV\hat{\ }H = \mathbb{X}$. Equivalently, the wireless AP device 102 may perform an eigendecomposition of the covariance matrix $C = \mathbb{X}\mathbb{X}\hat{\ }H$.

At 412, the wireless AP device 102 may process the first column of V that may correspond to the largest singular value of the singular value decomposition. The wireless AP device 102 may find the angles of V by $Aprime = -angl(V(:,1))$. At 414, Aprime may be used to determine an angle of arrival of the signal from the location device 106.

At 416, the wireless AP device 102 may use this information in a location algorithm to determine the location of the location device 106. The wireless AP device 102 may use the information to determine the orientation of the location device 106. For example, measurements may be obtained while a BLE beam may be swept in a 360° pattern. RSSI minima that may be observed as the BLE beam is swept in this way may be correlated across multiple (e.g., all) wireless AP devices 102 in the system 100 to determine the orientation of the location device 106.

At 418, the wireless AP device 102 may select antenna states for the location device 106 to cycle through. An antenna state may include a selection of an antenna and/or an antenna phase. In some implementations, the wireless AP device 102 may select antenna states that, when configured at the location device 106, may lead to substantially different signal patterns. For example, antenna states Si and Sj may be selected as preferred antenna states if the difference between their respective estimated phase vectors, $|Ai-Aj|$, is greater than a threshold α, even if the difference between their respective IMU readings, |Ri−Rj| is less than a threshold β.

In some implementations, the wireless AP device 102 may evaluate (e.g., all of) the measurements collected from a given location device 106. The wireless AP device 102 may consider antenna states that may be associated with the measurements. The wireless AP device 102 may consider IMU data that may be associated with the measurements. The IMU data may indicate that the location device 106 has moved. The wireless AP device 102 may use the measurements, antenna states, and/or IMU data to determine how correlated the measurements are and may select antenna states that produce decorrelated measurements.

For example, antenna states Si and Sj may be selected if they produce measurements that are highly decorrelated with each other. When such measurements are combined, their NLOS components may be attenuated, while their LOS components may be enhanced.

In some embodiments, the wireless AP device 102 may determine to configure the location device 106 with a greater or lesser number of antenna states to achieve a balance between performance and confidence. For example, a greater number of antenna states may produce greater confidence in location determination. In an environment that is severely affected by multipath interference, the wireless AP device 102 may request more antenna states to get a more rich set of measurement diversity.

On the other hand, a lesser number of antenna states may reduce latency and lead to more frequent updates in location determination. A lesser number of antenna states may result in sufficient confidence in location determination, for example, if it is determined that the location device 106 is moving. The motion of the location device 106 may provide sufficient diversity in measurements to decorrelate the NLOS components.

The wireless AP device 102 may use the degree of correlation or decorrelation or detected motion as a factor in determining how many antenna states the location device 106 should switch between. For example, if measurements are highly decorrelated, the wireless AP device 102 may determine that the location device 106 may send transmissions over fewer antenna states.

For example, the wireless AP device 102 may determine a correlation value associated with two or more antenna state measurements. If the correlation value is greater than a threshold, e.g., 0.99, the wireless AP device 102 may infer that no multipath interference is present. To reduce computation burden on the wireless AP device 102, the wireless AP device 102 may configure the location device 106 to use a single antenna state.

If the correlation value is in a first range C1 that is less than the threshold, the wireless AP device 102 may determine that some degree of multipath interference is present in the system 100. The wireless AP device 102 may configure the location device 106 to use a quantity N1 of antenna states.

If the correlation value is in a second range C2 that is less than C1, the wireless AP device 102 may determine that more multipath interference is present in the system 100. The wireless AP device 102 may configure the location device 106 to use a quantity N2 of antenna states, where N2 is greater than N1.

If the correlation value is in a third range C3 that is less than C2, the wireless AP device 102 may determine that even more multipath interference is present in the system 100. The wireless AP device 100 may configure the location device 106 to use a quantity N3 of antenna states, where N3 is greater than N2.

Those skilled in the art will appreciate that more or fewer ranges of correlation values and corresponding quantities of antenna states may be used by the wireless AP device 102.

The wireless AP device 102 may use the degree of detected motion, as represented by IMU data, as a factor in determining the number of antenna states the location device 106 should switch between. For example, if the IMU data indicates that the location device 106 is moving, e.g., if the IMU data is greater than a threshold, the wireless AP device 102 may determine that the location device 106 may send transmissions over fewer antenna states. If the IMU data is less than a threshold, the wireless AP device 102 may determine that the location device 106 should send transmissions over a greater number of antenna states and may configure the location device 106 accordingly.

The wireless AP device 102 may use the degree of correlation or decorrelation or detected motion as a factor in determining how often the location device 106 should change antenna states. For example, if measurements are highly decorrelated, the wireless AP device 102 may determine that the location device 106 may switch antenna states relatively infrequently. If the IMU data indicates that the location device 106 is moving, the wireless AP device 102 may determine that the location device 106 may switch antenna states relatively infrequently.

The wireless AP device 102 may configure the location device 106 with an antenna state configuration based on the multipath interference that it detects in the system 100. For example, if the wireless AP device 102 detects a high level of multipath interference, the wireless AP device 102 may configure the location device 106 to cycle between a higher number of antenna states. If the wireless AP device 102 detects a low level of multipath interference, the wireless AP device 102 may configure the location device 106 to cycle between a lower number of antenna states.

The wireless AP device 102 may configure the location device 106 with one of a number of antenna state configurations or profiles. For example, if the location device 106 is moving, the wireless AP device 102 may configure the location device 106 with a mobile profile that causes the location device 106 to cycle between a relatively low number of antenna states and/or causes the location device 106 to change antenna states less frequently. If the location device 106 is stationary, the wireless AP device 102 may configure the location device 106 with a stationary profile that causes the location device 106 to cycle between a relatively high number of antenna states and/or causes the location device 106 to change antenna states more frequently.

At 420, the wireless AP device 102 may send the selected antenna states to the location device 106 as an antenna state configuration. The antenna state configuration may indicate preferred antenna states for the location device 106 to cycle through. For example, the antenna state configuration may direct the location device 106 to cycle through a sequence of antennas and/or may direct the location device 106 to use one or more phases for each antenna.

Figure 5:
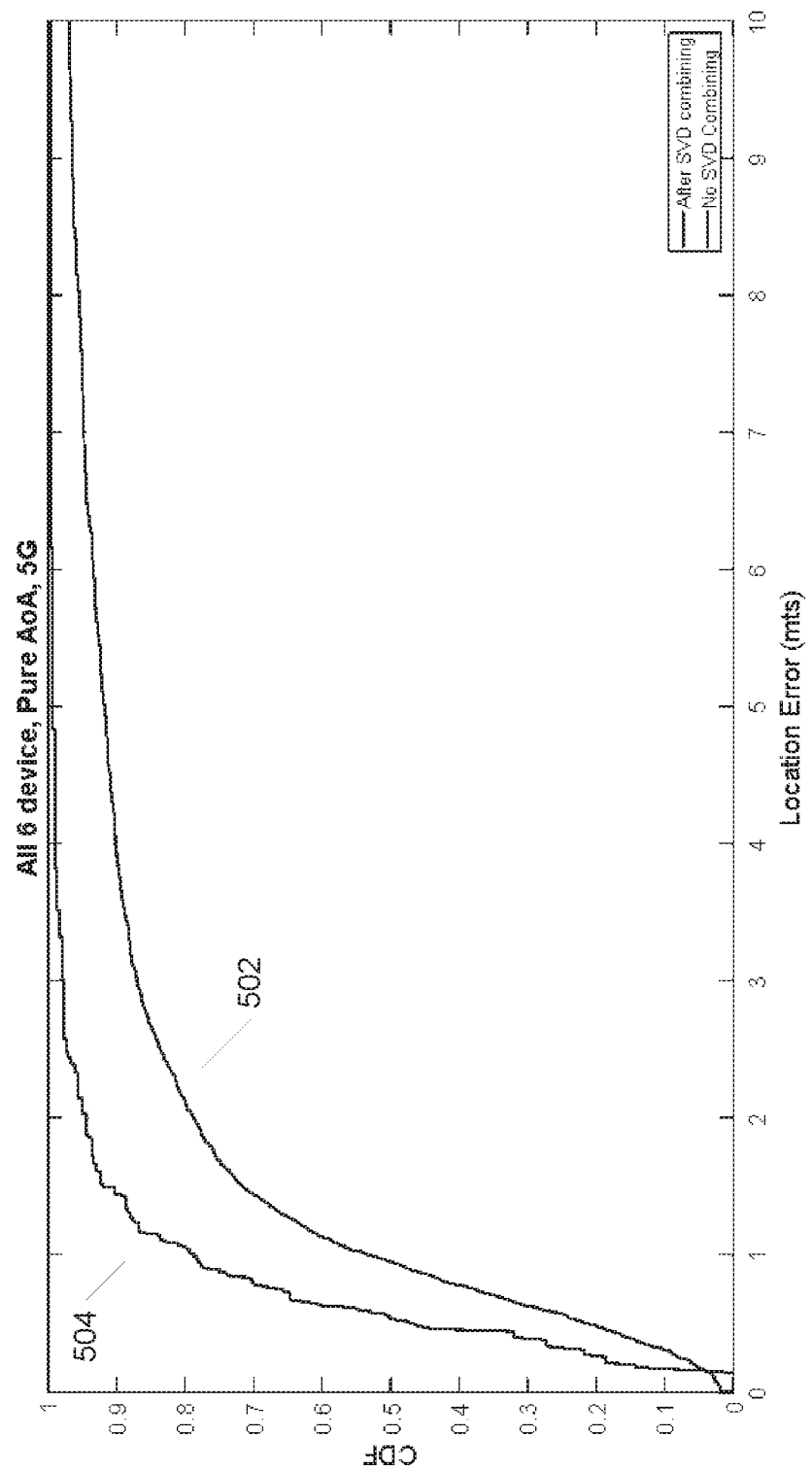
FIG. 5 is a diagram that illustrates example experimental results obtained from a wireless AP device and a location device.

FIG. 5 illustrates example experimental results obtained from a wireless AP device and a location device. In FIG. 5, the horizontal axis represents a location error. The vertical axis represents a cumulative distribution function (CDF). A curve 502 represents an example experimental result of location error observed with a single antenna state, e.g., without switching of antenna patterns. A curve 504 represents an example experimental result of location error observed with multiple antenna states after singular value decomposition (SVD) combining. As shown in FIG. 5, using multiple antenna states may produce a greater cumulative distribution function, e.g., greater confidence in the location determination.

Figure 6:
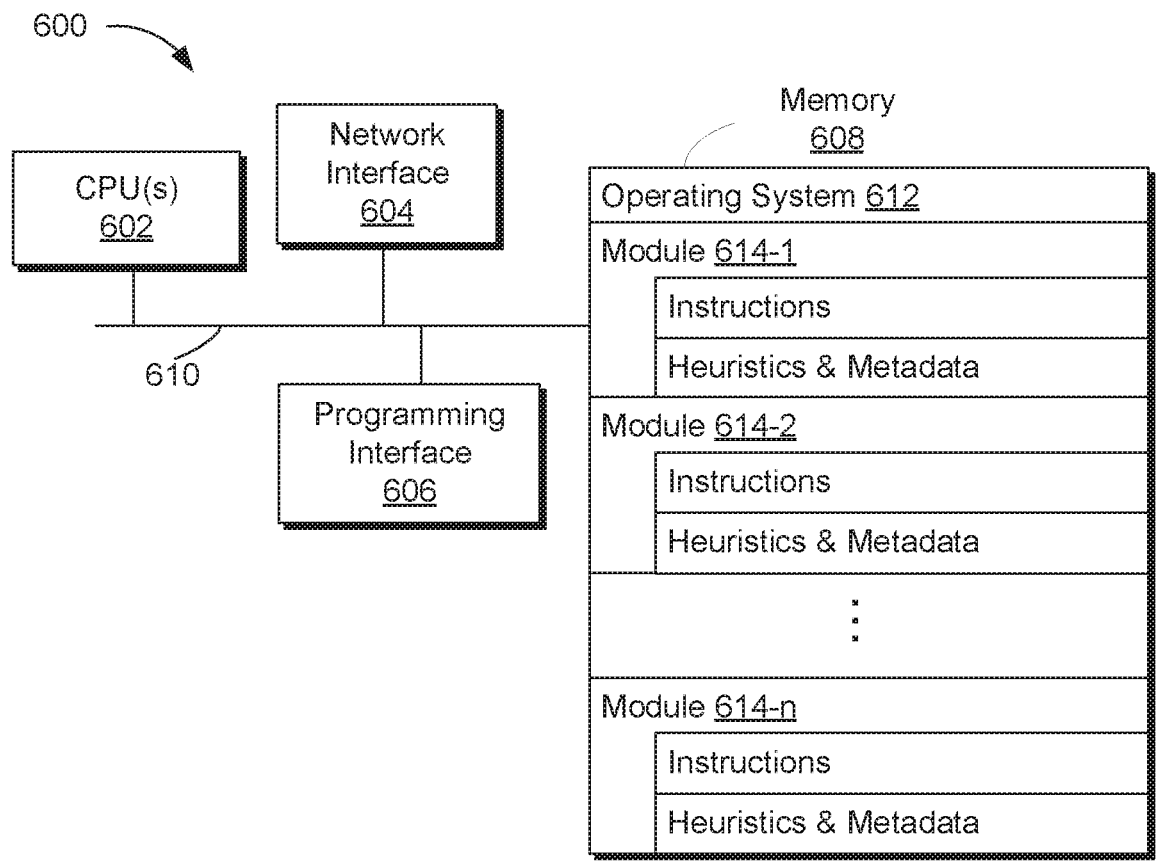
FIG. 6 is a block diagram that illustrates an example server system.

FIG. 6 is a block diagram of an example server system 600 enabled with one or more components of a device, server, or system in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 600 may include one or more processing units (CPUs) 602, a network interface 604, a programming interface 606, a memory 608, and one or more communication buses 610 for interconnecting these and various other components.

The network interface 604 may be provided to, among other uses, establish and/or maintain a metadata tunnel between a cloud-hosted network management system and at least one private network including one or more compliant devices. In some implementations, the communication buses 610 may include circuitry that interconnects and controls communications between system components. The memory 608 may include one or more of high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. The memory 608 may include one or more storage devices remotely located from the CPU(s) 602. The memory 608 may comprise a non-transitory computer readable storage medium.

In some implementations, the memory 608 or the non-transitory computer readable storage medium of the memory 608 may include (e.g., store) the following programs, modules, and data structures, or a subset thereof including one or more of an operating system 612 or various modules 614-1, 614-2 . . . 614-*n*. The modules 614-1, 614-2 . . . 614-*n*, individually and/or collectively, perform one or more of the operations described herein. To that end, in various implementations, the modules 614-1, 614-2 . . . 614-*n* may include respective instructions and/or logic, and heuristics and metadata.

Various aspects of implementations within the scope of the appended claims are described above. It should be apparent that the various features of implementations described above may be embodied in a wide variety of forms and that any specific structure and/or function described above is merely illustrative. Based on the present disclosure, one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
receiving, at a device, an antenna state configuration from a wireless access point (AP) device, the antenna state configuration defining a sequence of a plurality of different antenna states for the device; and
transmitting, from the device, a plurality of beacon signals using each of the plurality of different antenna states according to the sequence, wherein each transmitted beacon signal indicates a corresponding one of the plurality of different antenna states, and wherein the plurality of beacon signals indicates an inertial measurement unit (IMU) measurement.

2. The method of claim 1, wherein an antenna state comprises at least one of an antenna selection or an antenna phase.

3. The method of claim 1, further comprising:
switching between respective antenna states in the sequence of the plurality of different antenna states; and
sending a notification of a number of the respective antenna states in the sequence of the plurality of different antenna states.

4. The method of claim 1, wherein the device comprises at least one of a Bluetooth low energy (BLE) device or a WiFi location device.

5. The method of claim 1, wherein the sequence of the plurality of different antenna states for the device is selected based on inertial measure unit (IMU) information.

6. A wireless access point (AP) device comprising:
a network interface in communication with a network;

a processor configured to execute computer readable instructions included on a non-transitory memory; and a non-transitory memory including processor-readable instructions, that when executed by the processor, cause the wireless AP device to:

receive a beacon signal from a location device;

determine motion of the location device based on the beacon signal;

select an antenna state configuration based at least in part on the determined motion of the location device, the antenna state configuration defining a sequence of a plurality of different antenna states for the location device; and send the location device the selected antenna state configuration.

7. The wireless AP device of claim 6, wherein the processor-readable instructions cause the wireless AP device to select the antenna state configuration based at least in part on an environmental factor.

8. The wireless AP device of claim 6, wherein the antenna state configuration comprises a number of antenna states for the location device to switch between in a sequence of antenna states.

9. The wireless AP device of claim 6, wherein the processor-readable instructions cause the wireless AP device to select a plurality of different antenna states based on detected signal patterns.

10. The wireless AP device of claim 6, wherein the processor-readable instructions cause the wireless AP device to receive inertial measurement unit (IMU) information from the location device.

11. The wireless AP device of claim 10, wherein the processor-readable instructions cause the wireless AP device to determine an orientation of the location device based on the received IMU information.

12. The wireless AP device of claim 10, wherein the processor-readable instructions cause the wireless AP device to determine motion of the location device based on the received IMU information.

13. The wireless AP device of claim 10, wherein the processor-readable instructions cause the wireless AP device to select a quantity of antenna states in the antenna state configuration as a function of the received IMU information.

14. A wireless access point (AP) device comprising:

a network interface in communication with a network;

a processor configured to execute computer readable instructions included on a non-transitory memory; and a non-transitory memory including processor-readable instructions, that when executed by the processor, cause the wireless AP device to:

select an antenna state configuration defining a sequence of different antenna states for a location device;

send the location device the selected antenna state configuration;

receive beacon signals corresponding to the sequence of different antenna states; and determine the location of the location device based on the received beacon signals.

15. The wireless AP device of claim 14, wherein the processor-readable instructions cause the wireless AP device to select the antenna state configuration based at least in part on an environmental factor.

16. The wireless AP device of claim 14, wherein the processor-readable instructions cause the wireless AP device to select the sequence of different antenna states based on detected signal patterns.

17. The wireless AP device of claim 14, wherein the processor-readable instructions cause the wireless AP device to determine motion of the location device based on a received IMU signal.

18. The wireless AP device of claim 14, wherein the processor-readable instructions cause the wireless AP device to select a quantity of antenna states in the antenna state configuration as a function of a received IMU signal.

* * * * *

UNITED STATES PATENT AND TRADEMARK OFFICE
CERTIFICATE OF CORRECTION

PATENT NO. : 10,595,165 B2
APPLICATION NO. : 16/045425
DATED : March 17, 2020
INVENTOR(S) : Xu Zhang et al.

Page 1 of 1

It is certified that error appears in the above-identified patent and that said Letters Patent is hereby corrected as shown below:

In the Specification

Column 6, Line 1, delete "$\nabla j<i,$" and insert -- $\forall j<i,$ --, therefor.

In the Claims

Column 10, Line 65, Claim 5, delete "measure" and insert -- measurement --, therefor.

Signed and Sealed this
Twenty-third Day of June, 2020

Andrei Iancu
*Director of the United States Patent and Trademark Office*